United States Patent
Do

(10) Patent No.: US 11,326,572 B2
(45) Date of Patent: May 10, 2022

(54) SYSTEM AND METHOD OF PREDICTING VEHICLE ENGINE TORQUE USING ARTIFICIAL NEURAL NETWORK

(71) Applicant: HYUNDAI KEFICO CORPORATION, Gyeonggi-do (KR)

(72) Inventor: Hyung-Soo Do, Gyeonggi-do (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 0 days.

(21) Appl. No.: 17/142,874

(22) Filed: Jan. 6, 2021

(65) Prior Publication Data

US 2021/0222662 A1    Jul. 22, 2021

(30) Foreign Application Priority Data

Jan. 20, 2020    (KR) .................. 10-2020-0007390

(51) Int. Cl.
| | | |
|---|---|---|
| F02P 5/15 | (2006.01) | |
| F02D 13/02 | (2006.01) | |
| G06N 3/04 | (2006.01) | |
| G06N 3/08 | (2006.01) | |
| F02D 41/14 | (2006.01) | |
| F01L 13/00 | (2006.01) | |
| G05D 1/00 | (2006.01) | |
| F02D 37/02 | (2006.01) | |

(52) U.S. Cl.
CPC ............. *F02P 5/15* (2013.01); *F01L 13/0015* (2013.01); *F02D 13/0207* (2013.01); *F02D 41/1405* (2013.01); *G06N 3/04* (2013.01); *G06N 3/08* (2013.01); *F02D 37/02* (2013.01); *F02D 2041/1412* (2013.01); *F02D 2200/10* (2013.01); *F02D 2200/101* (2013.01); *F02D 2200/1004* (2013.01); *G05D 1/0088* (2013.01)

(58) Field of Classification Search
CPC .... F02P 5/15; F02D 41/1405; F02D 13/0207; F02D 2041/1412; F02D 37/02; F02D 2200/1004; F02D 2200/10; F02D 2200/101; F02D 13/0219; F02D 13/0215; F02D 41/2438; F02D 2041/1433; G05D 1/0088; G06N 3/04; G06N 3/08; Y02T 10/12

See application file for complete search history.

(56) References Cited

U.S. PATENT DOCUMENTS

| | | | | |
|---|---|---|---|---|
| 5,740,045 | A * | 4/1998 | Livshiz | F02P 5/1504 701/101 |
| 5,854,990 | A * | 12/1998 | Reckzugel | F02D 35/028 701/101 |
| 5,915,359 | A * | 6/1999 | Meyer | F02D 41/1405 123/436 |
| 5,915,368 | A * | 6/1999 | Ishida | F02D 41/1473 123/675 |

(Continued)

FOREIGN PATENT DOCUMENTS

JP    4840397 B2    12/2011

*Primary Examiner* — Phutthiwat Wongwian
*Assistant Examiner* — Susan E Scharpf
(74) *Attorney, Agent, or Firm* — Mintz Levin Cohn Ferris Glovsky and Popeo, P.C.; Peter F. Corless

(57) ABSTRACT

A method of predicting vehicle engine torque using an artificial neural network is provided. A data-based artificial neural network model is applied to more accurately calculate torque and reduce development costs for calibration and logics.

9 Claims, 3 Drawing Sheets

(56) References Cited

U.S. PATENT DOCUMENTS

| | | | | |
|---:|---|---|---|---|
| 6,236,908 B1* | 5/2001 | Cheng | ................ | F02D 41/0072 |
| | | | | 701/1 |
| 6,367,462 B1* | 4/2002 | McKay | ................... | F02B 47/08 |
| | | | | 123/568.21 |
| 6,371,066 B1* | 4/2002 | Cullen | ................ | F02D 41/2416 |
| | | | | 123/90.15 |
| 2004/0084024 A1* | 5/2004 | Malaczynski | ........... | G01L 23/22 |
| | | | | 123/435 |
| 2004/0206317 A1* | 10/2004 | Song | ................... | F02D 41/0002 |
| | | | | 123/90.11 |
| 2005/0109318 A1* | 5/2005 | Ichihara | ................... | F02D 37/02 |
| | | | | 123/406.45 |
| 2006/0157029 A1* | 7/2006 | Suzuki | ................... | F02P 5/1514 |
| | | | | 123/406.33 |
| 2006/0212209 A1* | 9/2006 | Cesario | ............... | F02D 41/1405 |
| | | | | 701/106 |
| 2007/0089697 A1* | 4/2007 | Hara | ..................... | F02D 35/023 |
| | | | | 123/90.15 |
| 2007/0203616 A1* | 8/2007 | Borrmann | ........... | F02D 41/1405 |
| | | | | 701/1 |
| 2009/0158830 A1* | 6/2009 | Malaczynski | .......... | G01M 15/11 |
| | | | | 73/114.04 |
| 2010/0083640 A1* | 4/2010 | Wang | ................... | F02D 41/1462 |
| | | | | 60/286 |
| 2011/0214650 A1* | 9/2011 | Wang | ................... | F02D 41/1405 |
| | | | | 123/703 |
| 2019/0145859 A1* | 5/2019 | Chen | ................... | F02D 41/1497 |
| | | | | 701/102 |

* cited by examiner

SYSTEM AND METHOD OF PREDICTING VEHICLE ENGINE TORQUE USING ARTIFICIAL NEURAL NETWORK

CROSS REFERENCE TO RELATED APPLICATION(S)

This application claims the benefit of Korean Patent Application No. 10-2020-0007390, filed Jan. 20, 2020, which is hereby incorporated by reference in its entirety into this application.

BACKGROUND

1. Technical Field

The present invention relates generally to a system and method of predicting vehicle engine torque using an artificial neural network (ANN), and more particularly, to a technology regarding a method of predicting vehicle engine torque, the method determining minimum spark timing of a gasoline engine using artificial intelligence learning.

2. Description of the Related Art

Generally, gasoline engine systems have used a thermodynamics-based model to calculate the current torque of the engine. Such a torque prediction technology of the related art has been configured based on factors affecting the generation of torque during the combustion process of a gasoline engine. In other words, in the torque prediction technology of the related art, a thermodynamics-based model has been used to adjust the torque of a gasoline engine system.

Such a thermodynamics-based model of the related art obtains current engine torque using a table including maximum torque by area, minimum spark timing by area, effects of inert gas in a gas mixture, effects of air-fuel ratios, and ignition efficiencies, based on a variety of pieces of information, such as calibration. In other words, in the related-art technology, a thermodynamics-based model is composed, and the effects of input variables on outputs are explained using physical laws and expressed in the form of formulas and tables.

However, with the application of the most recent technology for meeting exhaust gas regulations, such a torque calculation logic has become more complex. In addition, gasoline engine systems have become more complex along with the development of vehicle technologies. Accordingly, it becomes difficult to accurately calculate torque using the thermodynamics-based model of the related art.

In this related-art technology, it is more difficult to express relevant data using physic laws as the system becomes more complicated. Thus, the accuracy of the model may be lowered, or excessively large costs may be incurred. In other words, the related-art torque prediction technology suffers from increased calibration costs, which are problematic.

For example, since it is difficult to measure the amount of inert gas in real time, the amount of inert gas is indirectly predicted by modeling. However, the value obtained by the prediction is inaccurate, and it is significantly difficult to predict the effects of the inert gas. In addition, in the torque prediction method using the thermodynamics-based model, the non-linearity of the model is expressed on a table due to the effect of each physical quantity. Thus, a value set in the table may have a significant effect on the accuracy of the model, which is problematic.

SUMMARY

Accordingly, the present invention provides a system and method of predicting vehicle engine torque using an artificial neural network, in which limitations in a thermodynamics-based model may be overcome by applying a data-based artificial neural network model, so that torque may be calculated more accurately and development costs for calibration and logics may be reduced.

In order to accomplish the above objective, the present invention provides a method of predicting vehicle engine torque using an artificial neural network. The method may include: obtaining operating point information of a vehicle engine; configuring, by the vehicle engine, the operating point information into n number of data sets; extracting minimum spark timing for best torque (MBT) information from the n number of data sets; constructing the artificial neural network, in which the operating point information comprised of the n number of data sets is determined to be an input layer, spark timing information and torque information are determined to be an output layer, and a hidden layer is provided; performing learning using the artificial neural network based on the n number of data sets; storing the data and a spark timing efficiency curve, learned through the artificial neural network, in the ECU of the vehicle; inputting the current operating point information to the artificial neural network stored in the ECU and outputting the minimum spark timing information and maximum torque information calculated in the artificial neural network; calculating a spark timing efficiency by inputting a difference between the spark timing (current spark timing) information, calculated by the ECU using the operating point information, and the minimum spark timing information, calculated by the learned artificial neural network, to the spark timing information; and calculating real-time torque by multiplying the torque information with the calculated spark timing efficiency.

In addition, the learning using the artificial neural network may be performed by repeatedly varying weight and bias values. The operating point information may include at least one from among revolutions per minute (RPM) of the engine, an engine load, exhaust valve open (EVO) timing, intake valve close (IVC) timing, and an air-fuel ratio (lambda). In addition, the operating point information may include at least one from among an engine RPM, an engine load, EVO timing, exhaust valve close (EVC) timing, intake valve open (IVO) timing, IVC timing, and an air-fuel ratio (lambda).

Further, the operating point information may include at least one from among an engine RPM, an engine load, EVO timing, exhaust valve lift (EVL) timing, IVC timing, intake valve lift (IVL) timing, and an air-fuel ratio (lambda). In the obtaining of the operating point information, the operating point information and the spark timing according to the operating point information may be obtained according to a change from the position of a full advance phase angle to the position of a full retard phase angle. In the hidden layer, a trial and error method may be used.

The present disclosure as set forth above has the following effects.

First, the correlation between input variables and output variables is only defined by data-based learning. Thus, even a portion not expressed by a thermodynamics-based model may be included in the artificial neural network model, thereby improving accuracy.

Second, since it is not required to numerically express physical effects in a complicated system, logic development costs may be reduced, thereby advantageously improving economic competitiveness.

Third, since a calibration process for setting table values as in the thermodynamics-based model is substituted with the data-based learning process of the artificial neural network, there is an advantage in that costs may be significantly reduced.

BRIEF DESCRIPTION OF THE DRAWINGS

The above and other objectives, features, and advantages of the present invention will be more clearly understood from the following detailed description taken in conjunction with the accompanying drawings, in which.

DETAILED DESCRIPTION

Figure 1:
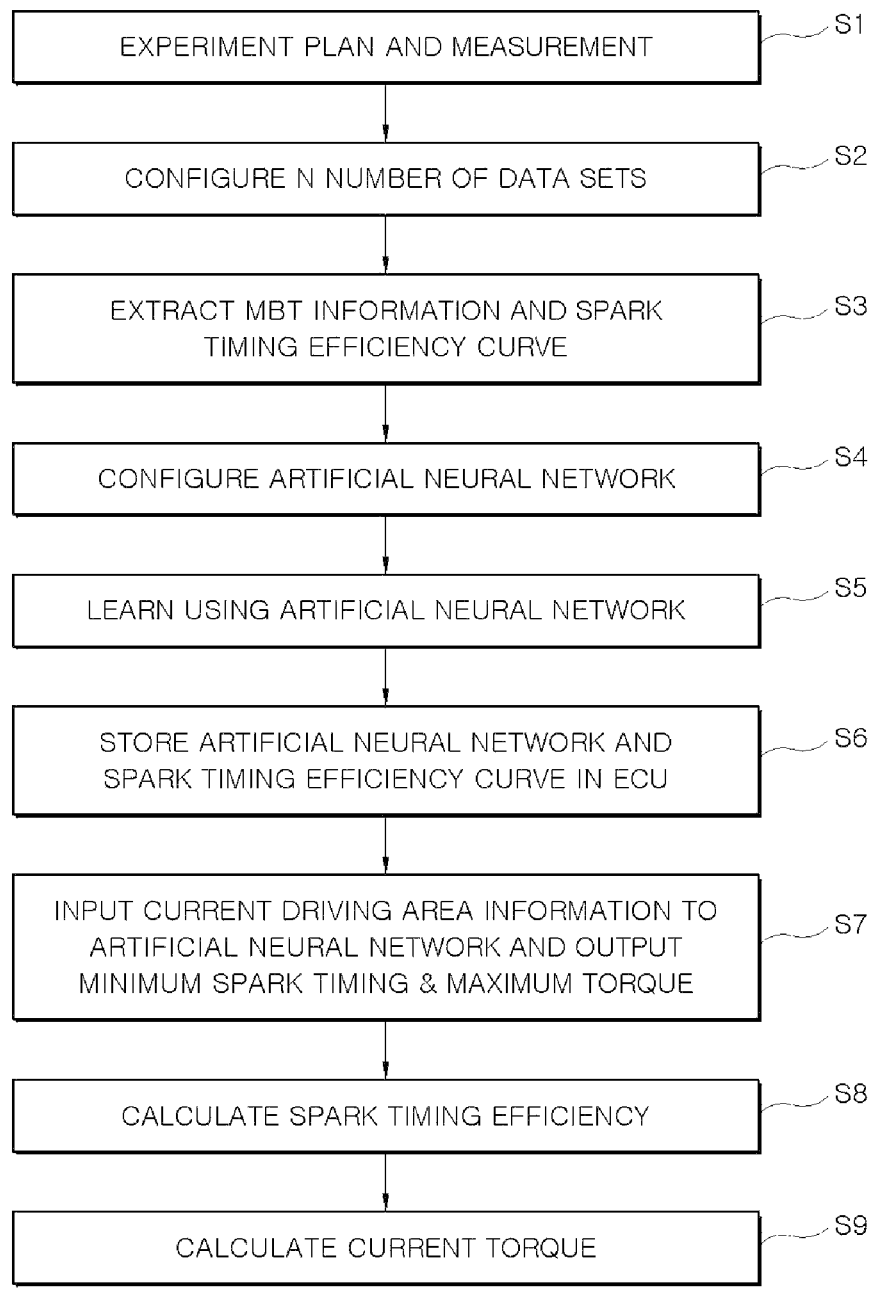
FIG. 1 is a flowchart illustrating a method of predicting engine torque according to the first exemplary embodiment of the present disclosure.
Figure 2:
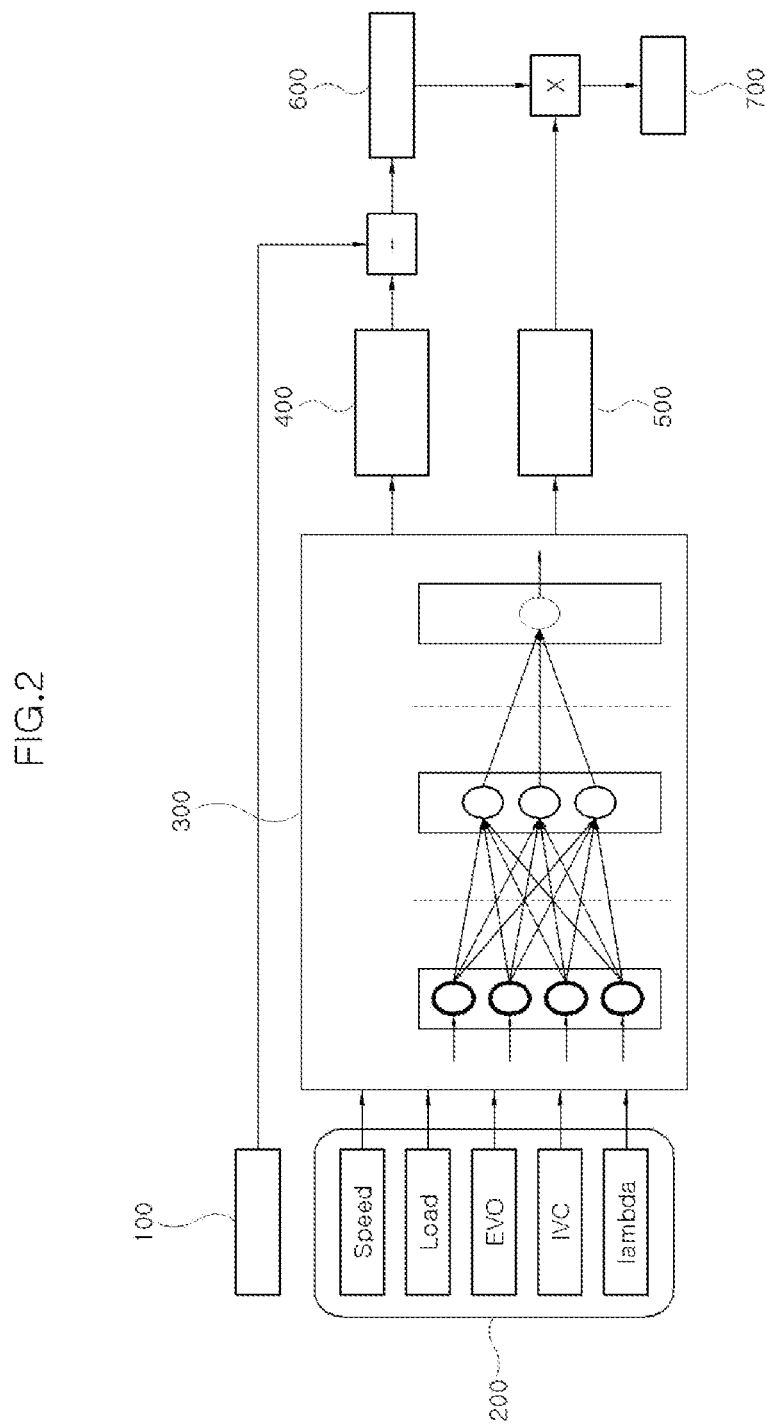
FIG. 2 is a diagram illustrating the sequence of the method of predicting engine torque according to a first exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Since the present disclosure may be modified in various forms and may have various embodiments, specific exemplary embodiments will be illustrated in the accompanying drawings and be described in detail with reference to the drawings. However, this is not intended to limit the present disclosure to the specific exemplary embodiments, and the present disclosure should be construed to encompass various changes, equivalents, and substitutions within the technical scope and spirit of the present disclosure.

In the drawings, the same components will be designated by the same reference numerals. Terms such as "first" and "second" may be used herein to describe a variety of elements, and the elements should not be limited by the terms. The terms are only used to distinguish one element from other elements. Thus, a first element may be referred to as a second element, and similarly, a second element may be referred to as a first element. The expression "and/or" includes any one or any combination of the plurality of mentioned items.

Unless otherwise defined, all terms including technical and scientific terms used herein have the same meaning as commonly understood by those skilled in the art to which the present disclosure belongs. It will be further understood that terms, such as those defined in commonly used dictionaries, should be interpreted as having meanings that are consistent with their meanings in the context of the relevant art and will not be interpreted in an idealized or overly formal sense unless expressly so defined herein.

A vehicle engine according to a first exemplary embodiment of the present disclosure may have a continuously variable valve timing (CVVT) mechanism. Accordingly, a method of predicting engine torque is as follows. The method described herein below may be executed by a processor.

First, in step S1, operating point information of a vehicle engine may be obtained. In particular, the operating point information may include at least one from among revolutions per minute (RPM) of the engine, an engine load, exhaust valve open (EVO) timing, intake valve close (IVC) timing, and an air-fuel ratio (lambda). In step S1, the operating point information and spark timing according to the operating point information may be obtained according to a change from the position of a full advance phase angle to the position of a full retard phase angle.

In other words, the torque may be measured by varying the spark timing from the position of the full advance phase angle to the position of the full retard phase angle at a variety of RPMs, engine loads, EVO and IVC timing, and air-fuel ratios. In addition, an engine system according to another exemplary embodiment of the present disclosure may have a continuously variable valve duration (CVVD) mechanism instead of the CVVT mechanism. The operating point information may include at least one from among an engine RPM, an engine load, EVO timing, exhaust valve close (EVC) timing, intake valve open (IVO) timing, IVC timing, and an air-fuel ratio (lambda).

In addition, an engine system according to a further exemplary embodiment of the present disclosure may have a continuously variable valve lift (CVVL) mechanism instead of the CVVT mechanism. Particularly, the operating point information may include at least one from among an engine RPM, an engine load, EVO timing, exhaust valve lift (EVL) timing, IVC timing, intake valve lift (IVL) timing, and an air-fuel ratio (lambda).

Afterwards, step S2 of configuring the operating point information obtained from the vehicle engine in advance into n number of data sets may be performed. In particular, the operating point information may be provided as n number of combined data sets including at least one from among an engine RPM, an engine load, EVO timing, IVC timing, and an air-fuel ratio (lambda).

Afterwards, step S3 of extracting information regarding minimum spark timing for best torque (MBT) and a spark timing efficiency curve from the above-configured n number of data sets of the vehicle engine may be performed. The MBT indicates minimum spark timing at which the maximum torque of the engine is obtained. The engine should be operated at optimum spark timing, but it may not be possible to get maximum torque due the phenomenon including knocking, etc. Therefore, the actual spark timing should be determined by considering the temperature, pressure, etc. of the combustion chamber over the operating point. Generally, to avoid knocking the actual spark timing has to be retarded more than MBT. The spark timing efficiency curve is a type of table-type data indicating the spark (ignition) timing efficiency for the spark (ignition) timing. The spark timing efficiency represents the ratio of torque to maximum torque according to the spark timing, with a value of 1 at the optimum (minimum) ignition timing and the value decreases with the retarded spark timing. An example of the spark timing efficiency curve of the engine is a torque curve over the spark timing. The spark timing efficiency curve of the engine according to the torque over the spark timing may be determined by the following steps.

In particular, the steps may include: a step of inputting torque data sets according to n number of operating points according to changes in the spark timing of the engine; a normalization step of dividing torque regarding the spark timing at respective driving points of the n number of operating points with maximum torque of the corresponding operating points and moving the spark timing of the maximum torque in parallel to be zero (0); a step of allocating slope factors, by which the slope of a curve indicated by the torque data sets according to the operating points may be changed, and movement factors, by which the curve may be moved in parallel, to the data sets according to the n number of operating points; configuring an objective function including differences of the respective data sets, to which the slope factors and the movement factors are allocated, from a logistic function having undetermined variables; determining the logistic function by deriving the undetermined variables by optimization of the objective function; and determining the logistic function to the spark timing efficiency curve of the engine.

For the n number of data sets including the MBT information and the spark timing efficiency curve, an artificial neural network is constructed and learned. In other words, in step S4, the artificial neural network may be constructed or generated. In the artificial neural network, the operating point information comprised of the n number of data sets may be determined to be an input layer, the spark timing information and the torque information may be determined to be an output layer, and a hidden layer may be provided.

Figure 3:
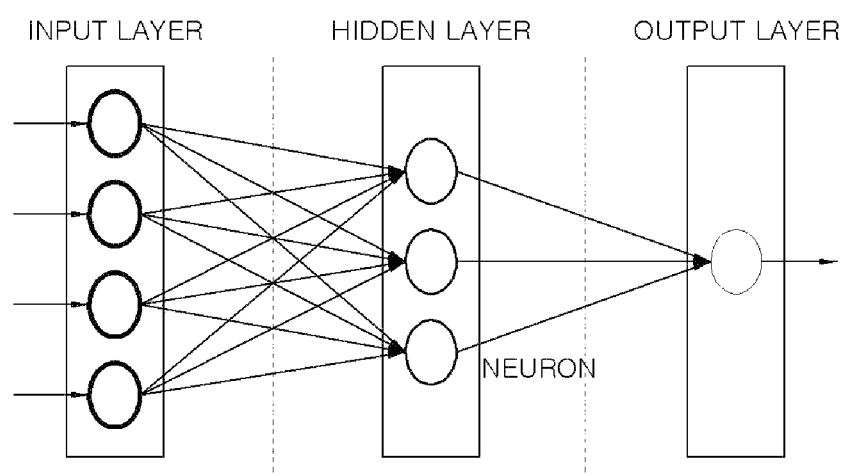
FIG. 3 is a conceptual diagram of an artificial neural network according to the first exemplary embodiment of the present disclosure.

More particularly, the vehicle engine may include an artificial neural network 300 including an input layer, a hidden layer, and an output layer, as illustrated in FIG. 3. More specifically, the input layer receives operating point information 200 comprised of the n number of data sets. The output layer outputs minimum spark timing information 400 and maximum torque information 500. The output layer of the artificial neural network is configured by providing the minimum spark timing and the maximum torque, obtained from the MBT information and the spark timing efficiency curve, to the output layer.

The hidden layer indicates an artificial neuron provided between the input layer and the output layer, i.e. a layer comprised of nodes. More specifically, the artificial neural network is one of detailed methodologies of machine learning, and has the form of a network in which a plurality of neurons serving as nerve cells is connected.

The artificial neural network is divided into a plurality of types according to the structure and the function. A most typical artificial neural network is a multilayer perceptron in which a plurality of hidden layer is present between a single input layer and a single output layer. The artificial neural network is a general term of a variety of models, such as the self-organizing map (SOM), the recurrent neural network (RNN), and the convolutional neural network (CNN). There are tens of types of artificial neural network. The artificial neural network applied in the first exemplary embodiment of the present disclosure may be a feedforward neural network (FFNet).

The feedforward neural network is a typical artificial neural network (ANN), in which input data proceeds to the output layer by passing through all nodes only a single time. The first layer is the input layer, the last layer is the output layer, and intermediate hidden layer is not connected externally. In addition, nodes in each layer are connected to nodes of the next layer, with no connections being present between the nodes in the same layer. Accordingly, the artificial neural network applied in the first exemplary embodiment of the present disclosure is referred to as the feedforward neural network.

Hereinafter, the artificial neural network 300 according to the first exemplary embodiment of the present disclosure will be described in more detail. FIG. 3 illustrates the correlation among the input layer, the hidden layer, and the output layer according to the first exemplary embodiment of the present disclosure. The model of the artificial neural network 300 has the structure as illustrated in FIG. 3. The greater the number of hidden layers or the greater the number of neurons, the more complex the correlation may be expressed.

Information input to the input layer may include information regarding respective driving points (e.g. RPM, load, EVO, IVC, and lambda). In particular, information output through the output layer may include the minimum spark timing information 400 and the maximum torque information 500. In the hidden layer, a trial and error method may be used in the process of measurement data learning.

Afterwards, the vehicle engine is subjected to learning step S5 using the artificial neural network 300 based on the n number of data sets. The learning step using the artificial neural network 300 may be performed by repeatedly varying weight and bias values. The model of the artificial neural network 300 defines the relationship between input and output only using data and a calculation structure of the artificial neural network 300 without using physical laws explaining the cause and consequence of physical phenomena. The model of the artificial neural network 300 repeatedly varies the weight and bias values, i.e. parameters in the model, via a machine learning algorithm on the basis of the input and output data. This process is referred to as "learning." For successful learning, appropriate input and output selection is required. The greater the amount of data used in the learning, the more generalized the model of the artificial neural network 300 may be.

Afterwards, the vehicle engine is subjected to step S6 of storing the data and the spark timing efficiency curve, learned through the artificial neural network 300, in the ECU of the vehicle. In other words, the artificial neural network and the spark timing efficiency curve are realized using the ECU used in the vehicle. Thereafter, the vehicle engine is subjected to step S7 of inputting the current operating point information 200 to the artificial neural network 300 stored in the ECU and outputting the minimum spark timing information 400 and the maximum torque information 500 calculated in the artificial neural network 300.

Subsequently, the vehicle engine is subjected to step S8 of calculating a spark timing efficiency 600 by inputting a difference between the spark timing information 100, calculated by the ECU using the operating point information, and the minimum spark timing information 400, calculated by the learned artificial neural network 300, to the spark timing information 100. Finally, the vehicle engine may more accurately calculate vehicle engine torque by step S9 of calculating current torque 700 in real-time by multiplying the maximum torque information 500 with the calculated spark timing efficiency 600. The vehicle may then be operated based on the calculated vehicle engine torque.

Although the spark timing efficiency curve may be obtained based on the n number of data sets, the spark timing efficiency curve may be derived more accurately as the artificial neural network continues learning. Based on the aging of the vehicle or the like, the minimum spark timing information 400 and the maximum torque information 500 output for the current operating point information may be based on the most recent spark timing efficiency curve, instead of being based on the old spark timing efficiency curve.

What is claimed is:

1. A method of predicting vehicle engine torque using an artificial neural network, comprising:
   obtaining, by a processor, information regarding n number of configured operating points of a vehicle engine;
   configuring, by the processor, n number of operating point data sets by adding spark timing and torque in the operating points;
   extracting, by the processor, minimum spark timing, maximum torque and spark timing efficiency curves from the n number of operating point data sets;
   configuring, by the processor, an artificial neural network including an input layer having the information regarding the n number of operating points, an output layer having the minimum spark timing and maximum torque, and a hidden layer between the input layer and the output layer;
   performing, by the processor, learning using the artificial neural network from the n number of operating point data sets, wherein the learning using the artificial neural network is performed by repeatedly varying weight and bias values of the operating points provided in the input layer;
   outputting, by the processor, the minimum spark timing and the maximum torque for information regarding a current operating point by inputting the information regarding the current operating point to the learned artificial neural network;
   calculating, by the processor, spark timing efficiency from the current spark timing and the minimum spark timing for the information regarding the current operating point; and
   calculating, by the processor, current torque from the spark timing efficiency.

2. The method of claim 1, wherein the artificial neural network and the spark timing efficiency curve learned in the learning using the artificial neural network are stored in an electronic control unit.

3. The method of claim 2, wherein the outputting of the minimum spark timing and the maximum torque for the information regarding the current operating point is output from the artificial neural network stored in the electronic control unit.

4. The method of claim 1, wherein the information regarding the n number of operating points is obtained by moving the spark timing from a position of a full retard phase angle to a position of a full advance phase angle.

5. The method of claim 1, wherein the information regarding the operating points includes at least one of revolutions per minute, a load, and an air-fuel ratio.

6. The method of claim 5, wherein, when the vehicle engine is provided with a continuously variable valve timing mechanism, the information regarding the operating points further includes exhaust valve open timing and intake valve close timing.

7. The method of claim 5, wherein, when the vehicle engine is provided with a continuously variable valve duration mechanism, the information regarding the operating points further includes at least one of exhaust valve open timing, exhaust valve close timing, intake valve open timing, and intake valve close timing.

8. The method of claim 5, wherein, when the vehicle engine is provided with a continuously variable valve lift mechanism, the information regarding the operating points further includes exhaust valve open timing, exhaust valve lift timing, intake valve close timing, and intake valve lift timing.

9. A system for predicting vehicle engine torque using an artificial neural network, comprising:
   a memory configured to store program instructions; and
   a processor configured to execute the program instructions, the program instructions when executed configured to:
   obtain information regarding n number of configured operating points of a vehicle engine;
   configure n number of operating point data sets by adding spark timing and torque in the operating points;
   extract minimum spark timing, maximum torque and spark timing efficiency curves from the n number of operating point data sets;
   configure an artificial neural network including an input layer having the information regarding the n number of operating points, an output layer having the minimum spark timing and maximum torque, and a hidden layer between the input layer and the output layer;
   perform learning using the artificial neural network from the n number of operating point data sets, wherein the learning using the artificial neural network is performed by repeatedly varying weight and bias values of the operating points provided in the input layer;

output the minimum spark timing and the maximum torque for information regarding a current operating point by inputting the information regarding the current operating point to the learned artificial neural network;

calculate spark timing efficiency from the current spark timing and the minimum spark timing for the information regarding the current operating point; and calculate current torque from the spark timing efficiency.

\* \* \* \* \*